Figure 1:
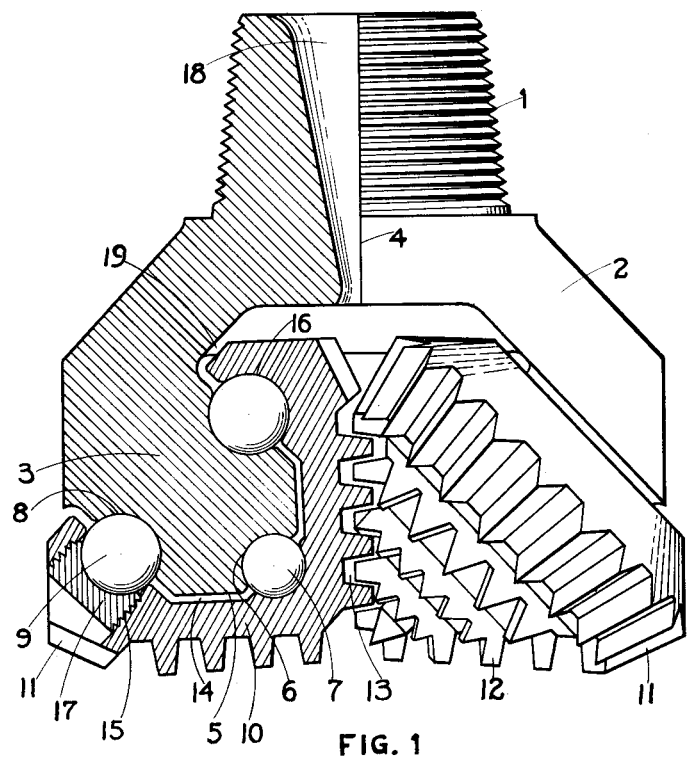

July 18, 1933.     H. W. FLETCHER ET AL     1,918,902
CONICAL CUTTER DRILL
Filed Sept. 12, 1931

HAROLD W. FLETCHER &
R. C. KULDELL     INVENTORS

BY *Jesse R. Stone*

ATTORNEY

Patented July 18, 1933

1,918,902

UNITED STATES PATENT OFFICE

HAROLD WHEELOCK FLETCHER AND RUDOLPH C. KULDELL, OF HOUSTON, TEXAS, ASSIGNORS TO HUGHES TOOL COMPANY, OF HOUSTON, TEXAS, A CORPORATION OF TEXAS

CONICAL CUTTER DRILL

Application filed September 12, 1931. Serial No. 562,532.

Our invention relates to roller earth boring drills of the type having toothed conical cutters thereon.

The particular combination of structures herein disclosed has certain undisputable advantages arising out of the unusually severe operating conditions peculiar to the work required of this class of tools.

Rotary bits of this description must operate at the bottom of deep wells, often more than a mile deep, in an atmosphere of gritty mud under a hydrostatic pressure of three thousand pounds per square inch or more, and exposed to extreme shock and overload due to the tremendous weight of the string of drill pipe by which the bit is rotated.

Structural requirements are unusually severe since the diameter of the hole definitely limits the amount of material that may be employed to carry the load, and stresses and bearing loads are hence inevitably much higher than would be dictated by normal "good engineering practice".

On the other hand many formations are encountered in deep drilling that can only be penetrated by subjecting the equipment and particularly the bit, to these extreme loads, and the situation is aggravated by the difficulty of determining and uniformly regulating these loads where the bit is thousands of feet below the operator and in a hole filled with mud.

Failure of the structure is a serious matter, out of all proportion to the value of the bit itself, as it might result in the loss of the hole valued at many thousands of dollars, or at the best expensive "fishing" operations necessary to recover the broken parts.

Failure of the bearings may be equally as expensive in the long run, as if the bearings wear out before the cutters are completely dull it is still necessary to retrieve and again insert into the hole the thousands of feet of drill pipe at great expense of labor and power, during which time, of course, no drilling progress can be effected.

Heretofore, it has been necessary to provide force feed oil lubrication to the bearings of cone bits to enable them to withstand the heavy loads required even for a few hours, (not to exceed forty at the most). This required a more or less complicated system of lubricator parts and oil ducts which in itself was subject to derangement under the severe conditions encountered. Various attempts were made to substitute anti-friction bearings of one form or another which were uniformly unsuccessful because the small space available for the bearing assembly unduly restricted the size of the balls or rollers which were thus incapable of supporting the heavy loads encountered.

The applicants have devised a structural combination which to a high degree meets the severe restrictions of this service. We have chosen to replace the entire bit when worn rather than just the cutters and bushings as has been previous practice. This enables us to discard the bushing entirely, and form the bearing integrally with the head, saving to the structure the entire space formerly occupied by the bushing which contributed little to the structural strength but merely provided bearing area and the means for replaceably attaching cutters. This simplification so cheapens the cost of manufacture as that the complete bit can be produced about as cheaply as the previously used cutter and bushing assembly. In addition the replacement of worn bits is much more readily accomplished in the field, since it is necessary only to unscrew the worn bit and replace it with a new one, as opposed to the rather lengthy process of unscrewing the bit, separating the two halves, removing the worn cutters, replacing with new cutters, cleaning, assembling and filling the lubricator, assembly the two halves of the bit and again screwing the bit onto the drill stem, as formerly practiced. The great advantage of simplified field handling is obvious, as the danger of error in assembly is entirely avoided and the "particular" operations of assembly are all completed in the shop with appropriate tools, under good working conditions and with expert supervision and inspection.

The invention includes as a valuable feature the mounting of the cutters on a cone bit directly upon the shaft without the necessity of a bushing, the bearing being maintained by antifriction means between the shaft and cutter.

We have as an object to provide a drill which will be enabled to rotate smoothly without lubricant or with a comparatively small amount thereof, and which is arranged to allow the circulation of drilling fluid about the bearings to act as a lubricant and prevent the bearings from becoming overheated.

It is a further object to provide a series of balls or other antifriction means which act not only to reduce friction but to also hold the cutters on the shafts and hold the cutters from contact with the bearing pins or cutter shafts.

By eliminating the usual bushing between the cutter shaft and the cutter and providing antifriction means spacing the shaft and cutter apart, the shell of the cutter can be made thicker and stronger as stated, which is an important feature.

It is a further object to provide a head of simple and cheap construction which can be discarded with the cutters when the cutters are worn out, the idea being to furnish the driller with a head and cutters, mounted thereon, ready for drilling, the whole assembly of which can be then used in drilling, and when the cutters are worn out the whole drill may be discarded.

In the drawing herewith Fig. 1 shows a side view partly in elevation and partly in central vertical section disclosing a preferred form of our invention.

Figure 2:
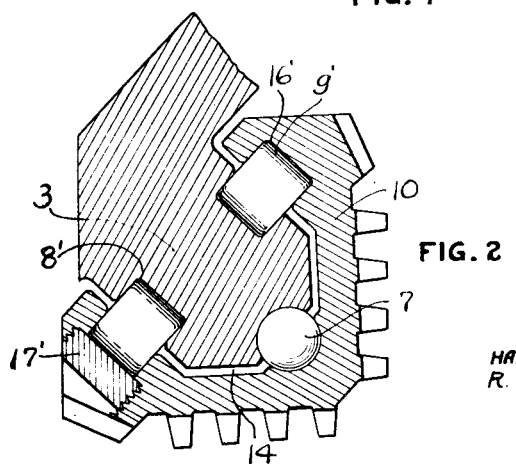

Fig. 2 is a sectional view of a cutter with a modified bearing.

The head of the drill is made as simple as possible. There is an upper threaded shank 1 for attachment to the drill stem. Two opposite downwardly inclined legs 2 are connected with the base of the shank. Said legs are spaced well apart at their lower ends and are formed with inwardly projecting cutter shafts 3 thereon inclined downwardly in the same vertical plane. The shank is split at 4 for purposes of manufacture and assembly, and an axial passage 18 is formed therein to allow the flow of flushing fluid to the cutters 10.

The cutter shafts 3 are approximately cylindrical, the ends being tapered at 5 and the extremity of each shaft is formed with a hemispherical recess 6 in which is mounted a ball 7 to take the longitudinal thrust of the cutter during use.

The cutters 10 are formed on the exterior with cutting teeth in the usual manner. No particular form of cutting teeth are material to this invention, but we show teeth 11 at the base and small teeth 12 toward the apex. The interior of each cutter is shaped to receive the shaft 3, the inner chamber 9 being preferably larger than the shaft to provide clearance through which the flushing fluid can circulate, and to prevent drag of the cutter upon the shaft.

The cutter has an inner groove 16 of annular form, half round in cross section, to receive a row of balls 9. The shaft is also formed with a peripheral groove 8 to register with the groove in the cutter and form a race in which the balls may roll. These balls are of comparatively large diameter to space the cutters away from the shank and also to provide a means to hold the cutter on the shaft which will not easily break up or fail to perform its function in use. The bearing member 7 at the end of the shaft assists in centering and holding the cutter rotatably in position away from the shaft. This end bearing will not rotate continually, but will frequently shift its position so as not to allow any particular area to wear flat.

The balls 9 are assembled in position by inserting the same through a radial opening 15 in the cutter. This opening is normally closed by a threaded plug 17 formed with a transverse groove on its inner face adapted to conform to the shape of the groove 16 in the cutter and allow the balls to roll freely.

In the use of our new drill, the two parts of the head are separately provided with cutters before they are assembled together and after the cutters are mounted, the two halves of the head may best be welded together.

While ball bearings are the preferred form of antifriction bearings to be employed, it is possible to employ other types of bearings and in Fig. 2 we show cylindrical rollers 9′ employed adjacent the base of the cutter. These rollers act, as do the balls 9, to retain the cutters in position and also to prevent frictional contact of the cutter upon the shaft. The plug 17′ which fills the hole through which the rollers are inserted has a flattened end registering with the outer wall of the channel 16′ in the cutter. This bearing will hold the cutter in proper centering position until the cutting teeth are worn out without ceasing to function.

The cutters are spaced from the shaft by the bearings. This has the advantage of providing a bearing for the cutter which is of an antifriction nature, prevents wear upon the body of the shaft, and also allows free circulation of slush about the bearings. No washer is employed between the cutter and the head, thus allowing a space at 19 through which the slush can enter freely to the bearing. If slush lubrication is not desired, the space 14 about the shaft may be filled with a stiff lubricant.

As a result of the elimination of the bushing and the substituting of a ball bearing in which the balls are of relatively enormous size (1¼″ in diameter for instance, on an inner race diameter of only 1⅝″), and by forming the inner race directly on the pin of the head and the outer race directly in the body of the cone cutter, we are able to carry the heavy bearing loads involved and at the same time to approximately double the wall thickness of the cone thus permitting the formation of deep teeth, heretofore inadmissible because of weakness of the cone shell; we at the same time are enabled to use a stronger pin structure, of a form much better adapted to withstand vibratory load, and these pins moreover are required to wear out only one set of cutters, and hence are much less likely to suffer fatigue failure; we produce a simple and strong structure, relatively cheap to manufacture and use and certain to appreciably reduce the cost of drilling deep holes.

It should be understood that the cutters turn to perform their cutting function upon the slippery bottom of the well only by the traction of the teeth of the cutters on the bottom of the hole. In so turning, they must overcome bearing friction which hence must not be excessive. With our structure, the bearing friction is reduced to a minimum, and a large amount of bearing wear may take place before a drag will be likely to occur upon the shafts. Our exceptionally large bearings, obtained by eliminating bushings, will last longer than the cutting teeth on the outer faces of the cutters and will assure full service from the cutters.

This assembly may be made cheaply and when the cutter teeth are worn out, the whole bit may be discarded as junk and a new bit substituted. The great feature of advantage in the drill is its long wearing qualities, its strength, and the freely rotatable type of cutter employed allowing the driller to get the full benefit of the cutting action of the teeth on the cutter without bearing trouble, or necessity of any costly and troublesome arrangement for lubrication. Its use will save the driller a material amount of time in assembly and will give him a better service from his cutters.

What we claim as new is:

1. A drill head, cutter shafts thereon inclined downwardly toward each other, a toothed roller cutter enclosing the end of each shaft, a spherical shaped member projecting from the extremity of said shaft, to space the cutter from said shaft and bearings adjacent the base of said cutter to space the cutter from said shaft.

2. A well drill comprising a threaded shank, downwardly and outwardly inclined legs on said shank, cutter shafts inclined downwardly and inwardly from said legs, toothed cutters enclosing the ends of said shafts, the interior of said cutters being larger than the said shafts to provide a clearance space on all sides between each cutter and its shaft, and a plurality of separate rolling bearing members between said cutter and shaft, acting to space said cutter and shaft part.

3. A well drill comprising a threaded shank, downwardly and outwardly inclined legs on said shank, cutter shafts inclined downwardly and inwardly from said legs, toothed cutters enclosing the ends of said shafts, the interior of said cutters being larger than the said shafts to provide a clearance space between the cutter and shaft, a row of balls acting as a bearing adjacent the base of each shaft engaging in grooves in the cutter and shaft and spacing the cutter from the shaft and also acting to hold said cutter on said shaft and antifriction bearing means at the forward end of said shaft acting to space said cutter from said shaft at that end.

4. In a well drill, a head, shafts inclined downwardly therefrom, said shafts being approximately cylindrical and having tapered ends, cutters surrounding the ends of said shafts and having interior recesses slightly larger than said shafts to allow wide clearance between them, and rolling bearings to space the cutters from said shafts said cutters being supported entirely upon said rolling bearings.

5. A roller well drill including a head, a pair of opposed shafts thereon, a cutter enclosing the end of each of said shafts, each shaft having an axial recess at its end, a ball in said recess spacing said cutter from said shaft, and means to retain said cutter rotatably on said shaft.

6. A roller well drill including a head, a pair of opposed shafts thereon, a cutter enclosing the end of each of said shafts, each shaft having an axial recess at its end, a ball in said recess spacing said cutter from said shaft, the interior of said cutter being larger than said shaft, a race of balls adjacent the base of said cutter to hold said cutter in position and allow free circulation of slush to said end ball.

7. A well drill including a head, a cutter shaft thereon, a cutter enclosing the end of said shaft and spaced slightly from said shaft, a ball at the end of said shaft fitting in mating recesses in said shaft and said cutter, and spacing said cutter from the end of said shaft, and bearings between the base of said cutter and said shaft, there being space for free circulation of slush about said bearings and said ball.

HAROLD WHEELOCK FLETCHER.
RUDOLPH C. KULDELL.